United States Patent Office 3,431,655
Patented Mar. 11, 1969

3,431,655
FREEZE DRYING
Kenneth M. Grover, Pound Ridge, and Neophytos Ganiaris, Riverdale, N.Y., assignors to Struthers Scientific and International Corporation, a corporation of Delaware
Filed June 13, 1967, Ser. No. 645,677
Claims priority, application Great Britain, June 17, 1966, 27,112/66
U.S. Cl. 34—5   10 Claims
Int. Cl. A23f 1/06; A23c 1/06; A23l 3/36

ABSTRACT OF THE DISCLOSURE

A comestible liquid or the like is introduced as particles into the top of a column having a flow of a refrigerated gas therein to freeze the particles and form prills which are collected and freeze dried.

Background of the invention

Liquid foods such as coffee, beer, milk, orange juice, and the like, or biological substances such as blood, are freeze dried for purposes of storage and preservation, during the course of processing to form a desired end product, and for other reasons.

Summary of the invention

This invention provides both a process and an apparatus for freeze drying comestibles, particularly coffee, and the like. A concentrated solution of the material to be freeze dried is formed into relatively uniform droplets or particles in the top of a container or column. A circulating current of a refrigerated gas is passed through the column to freeze the falling liquid particles to form prills. These prills are collected and freeze dried by the sublimation of their frozen liquid contents.

Description of the preferred embodiment

Figure 1:
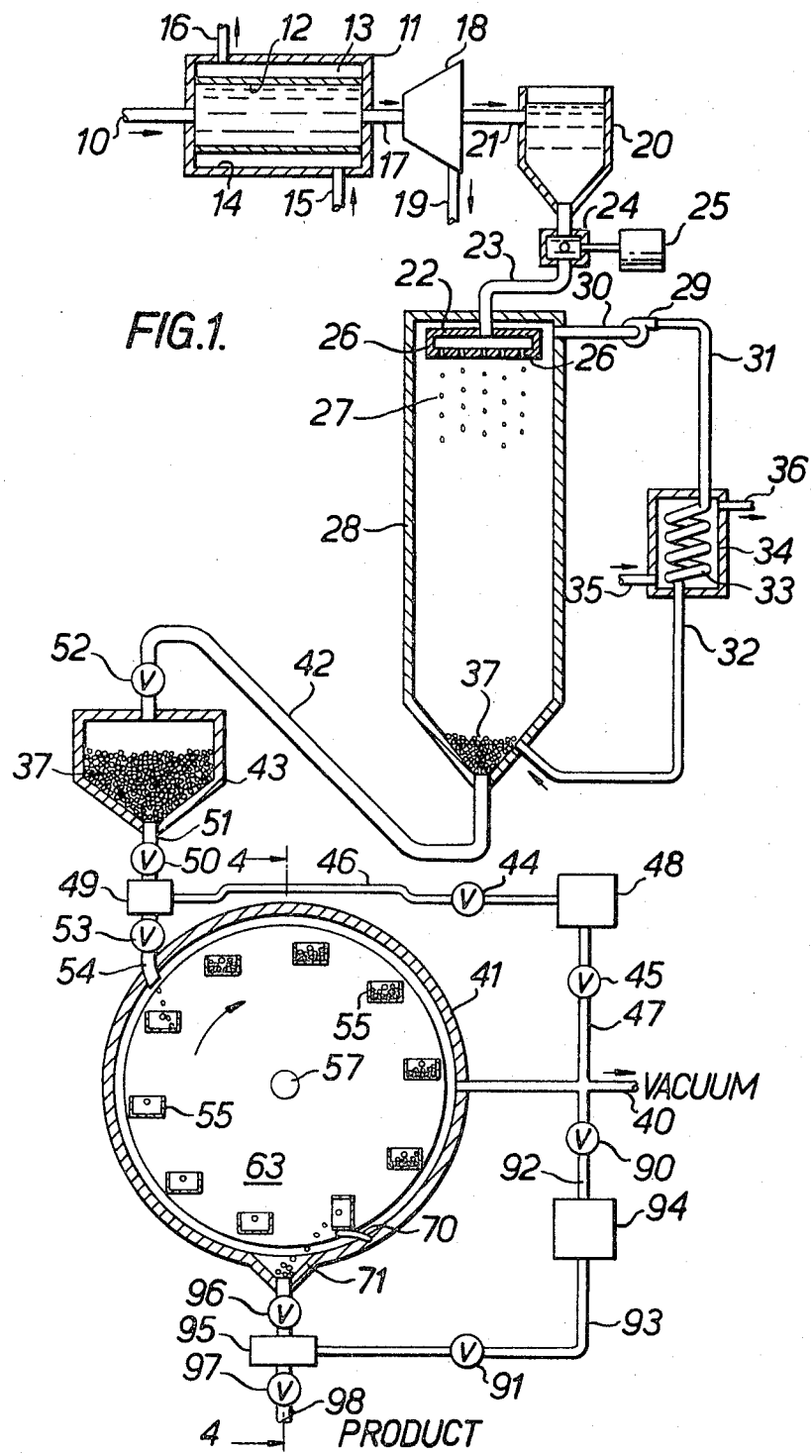
FIGURE 1 is a schematic diagram showing the elements of the freeze drying apparatus of this invention in vertical section.

As shown in FIGURE 1, a solution to be freeze dried, such as coffee, is introduced through feed pipe 10 into a conventional crystallizer 11 which has a crystallization chamber 12 surrounded by a refrigerant 13 in a jacket 14. The refrigerant 13 enters jacket 14 through pipe 15 and is withdrawn through pipe 16. The refrigerant 13 cools the coffee solution to cause crystal growth therein. The coffee solution and crystal slurry thus formed passes through pipe 17 to centrifuge 18 which removes ice crystals through pipe 19. Concentrated and cooled coffee solution enters the liquid storage tank 20 through pipe 21. If desired, any multistage freeze concentration system may be used up to this point in the process of this invention.

Tank 20 feeds coffee solution to the prilling head 22 through pipe 23. A rotary valve 24 driven by motor 25 periodically interrupts the flow of liquid through pipe 23 to provide periodic pulsations of pressure in the prilling head 22. The pulsations of pressure may vary from two to thirty per second. Apertures 26 in the bottom of prilling head 22 allow uniform and fairly large droplets 27 of coffee solution to form which fall downward within prilling column 28.

A conduit or duct 30 leads from the top of column 28 to blower 29 which forces a gas through ducts 31 and 32 and coil 33. Coil 33 is disposed in a shell 34 into which refrigerant is introduced through pipe 35 and from which it is withdrawn through pipe 36. Thus, it may be seen that a gas is flowed upward in column 28 to be withdrawn, refrigerated, and recycled. This gas, preferably nitrogen which is inert, freezes the falling droplets 27 to form small spherical beads or prills 37 of coffee solution which collect at the bottom of column 28. The gas used to freeze the prills 37 is preferably at atmospheric pressure although the pressure of this refrigerant gas may be varied.

Line 40 leads from sublimation cabinet 41 to a suitable vacuum source. Line 42 extends from the bottom of column 28 to a cold insulated hopper 43 for frozen prills 37. If the valves 45 and 44 in the vacuum lines 47 and 46 are successively opened and closed, a vacuum will be drawn in the vacuum reservoir 48 which, in turn, will draw a vacuum in the prill charge metering leg 49. When valve 50 is opened, at least a partial vacuum will be drawn in hopper 43 and frozen prills will slide downward to fill leg 49. Valve 50 is then closed. The partial vacuum in hopper 43 may be used to draw prills from the bottom of column 28 into hopper 43 as in conventional air slide delivery devices. Other devices, such as mechanical conveyors, may be used to deliver prills from column 28 to hopper 43. As has been described, when valve 50 is opened, prills 37 fill the charge metering leg 49. Valve 50 may then be closed and the valve 53 in line 54 opened to deliver prills to the trays 55.

Figure 2:
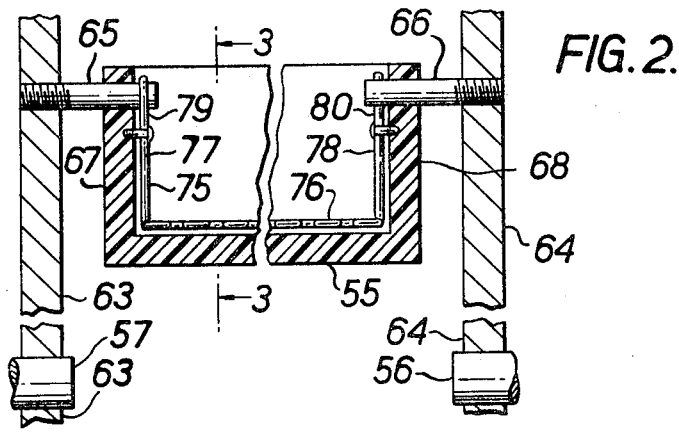
FIGURE 2 is a vertical section through a prill freeze drying tray shown suspended between fragments of rotatably mounted tray support discs, the tray having a central portion broken away.
Figure 3:
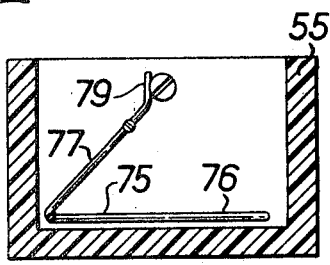
FIGURE 3 is a section taken on line 3—3 of FIGURE 2.
Figure 4:
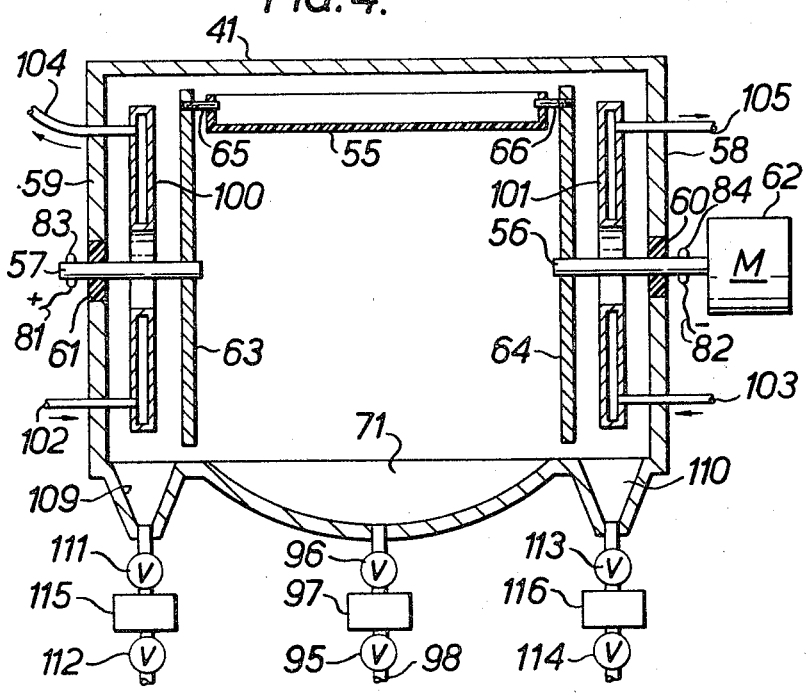
FIGURE 4 is a longitudinal vertical section taken on line 4—4 of FIGURE 1 through the prill freeze drying cabinet of this invention.

Referring additionally to FIGURES 2, 3 and 4, sublimation cabinet 41 has two shafts 56 and 57 enter its end walls 58 and 59 through electrically insulated bushings 60 and 61. Shaft 56 is driven to rotate slowly by means of a suitable motor 62. Tray support discs 63 and 64 are fixed on the inner ends of the shafts 57 and 56. Pairs of tray support shafts 65 and 66 extend inward from spaced positions about the periphery of the tray support discs 63 and 64. Trays 55 of plastic or the like are pivotally suspended by their end walls 67 and 68 on each pair of shafts 65 and 66.

As may be seen in FIGURE 1, valve 53 in line 54 is opened to fill each tray 55 with prills as it moves under a laterally flared end of line 54. As each tray 55 of prills revolves, a suitable time elapses to vacuum dry or otherwise allow sublimation of the prills. A spring arm 70 catches passing trays 55 to dump the dried prills into a product hopper 71 formed in the bottom of sublimation cabinet 41.

To assist in the sublimation of the prills in the trays, a low capacity heating element 75 may be laid in the form of coils 76 in the bottom of each tray 55 as shown in FIGURES 2 and 3. The ends 77 and 78 of each element 75 terminate in spring material electrical contacts 79 and 80 which make an electrical connection with the shafts 65 and 66, respectively. Current is thus fed to each element 75 by the leads 81 and 82 and the contacts 83 and 84 which conduct current to the shafts 57 and 56, respectively, and the discs 63 and 64.

To remove the product, sublimated or freeze dried prills of coffee, valves 90 and 91 in lines 92 and 93 are successively opened and closed to draw a vacuum in vacuum reservoir 94 and the product delivery leg 95. Valve 96 is opened to allow the product to fall into product leg 95 and then closed. Valve 97 may then be opened to allow the product to fall from line 98.

Referring now to FIGURE 4, moisture condensing plates 100 and 101 are cooled to condense moisture sublimated from the prills. Refrigerant enters plates 100 and 101 through pipes 102 and 103 and leaves through pipes 104 and 105. After an amount of moisture is condensed and frozen on these plates 100 and 101, a warm fluid may be introduced into them for a short interval of time to melt free the ice crystals formed thereon and allow them to fall into the ice hoppers 109 and 110. This ice is removed by successively opening and closing the valves 111 and 112, and 113 and 114 disposed on each side of the ice removal legs 115 and 116.

It is to be understood that the preferred embodiment of this invention hereinbefore described is purely illustrative. Modifications may be made without departing from the spirit and scope of the invention except as it may be more limited in the appended claims.

What is claimed is:

1. In the process of freeze drying a comestible solution or the like, the steps of:
   (a) refrigerating a gas to a temperature below the freezing point of the solution;
   (b) forming the solution into droplets by pulsation at the rate of two to thirty pressure pulses per second and dropping the droplets into the refrigerated gas to fall through the gas and freeze;
   (c) collecting the frozen particles; and
   (d) sublimating water content from the collected frozen particles.

2. The process according to claim 1 wherein the comestible solution is coffee.

3. The process according to claim 2 wherein the refrigerated gas is inert.

4. The process according to claim 2 wherein the coffee solution is formed into particles by introducing it with periodic pulsations in pressure through small apertures into the refrigerated gas.

5. The process according to claim 4 wherein water content of the frozen particles is sublimated by vacuum drying.

6. The process according to claim 5 wherein the inert, refrigerated gas is flowed upward freezing falling particles of solution into prills.

7. Apparatus for freeze drying a comestible solution or the like comprising, in combination:
   (a) means providing a supply of solution cooled near its freezing point;
   (b) a prilling column;
   (c) a prilling head containing a plurality of small apertures, said prilling head being disposed in the top of said prilling column;
   (d) means delivering cooled solution from said supply to said prilling head so that said solution emerges from said prilling head in periodic pressure pulses as particles;
   (e) means supplying a flow of gas refrigerated below the freezing temperature of said solution through said column, particles of said solution falling downward in said column being frozen into prills by said refrigerated gas;
   (f) means removing said frozen prills from the bottom of said column; and
   (g) means sublimating water content from said prills.

8. The combination according to claim 7 wherein said means supplying a flow of refrigerated gas through said column comprises a blower, a refrigeration unit, and a conduit conducting gas from the top of said column to said blower and said refrigeration unit to recycle refrigerated gas to the lower part of said column to flow upward in said column.

9. The combination according to claim 8 wherein said means sublimating water content from said frozen prills is a vacuum cabinet containing means to receive said prills for a dwell time in said cabinet, means depositing said prills in said vacuum cabinet, means condensing moisture sublimated from said prills in said vacuum cabinet, means removing vacuum dried prills from said vacuum cabinet after a dwell time therein, and means removing condensed moisture from said vacuum cabinet.

10. The combination according to claim 9 with the addition of heating elements associated with said means to receive said prills for a dwell time in said cabinet, said heating elements speeding up the sublimation of water content from said frozen prills.

References Cited

UNITED STATES PATENTS

| | | | |
|---|---|---|---|
| 2,751,687 | 6/1956 | Coltoy | 34—5 |
| 3,162,019 | 12/1964 | Porter | 62—74 |
| 2,471,035 | 5/1949 | Hurd | 34—5 |
| 2,813,350 | 11/1957 | Berger | 34—5 |
| 3,243,892 | 4/1966 | Ullrich | 34—5 |
| 3,313,032 | 4/1967 | Malecki | 34—5 |

FOREIGN PATENTS 952,920   3/1964   Great Britain.

WILLIAM J. WYE, *Primary Examiner.*

U.S. Cl. X.R.
34—92; 62—74